United States Patent [19]
Swift et al.

[11] Patent Number: 5,607,030
[45] Date of Patent: Mar. 4, 1997

[54] CENTRIFUGAL SHOPPING CART BRAKE

[76] Inventors: Daniel P. Swift, 1918 Curtis, Laramie, Wyo. 82070; Thomas R. LaCroix, 725 Rood Ave., Grand Jct., Colo. 81501; William E. Bullock, P.O. Box 1328, Glenwood Springs, Colo. 81602

[21] Appl. No.: 573,191

[22] Filed: Dec. 15, 1995

[51] Int. Cl.⁶ .................................................. B60B 33/00
[52] U.S. Cl. ...................... 188/1.12; 188/77 W; 16/35 R
[58] Field of Search .......................... 188/1.12, 74, 77 W, 188/78, 68, 69, 19; 16/35 R, 45; 280/33.994

[56] References Cited

U.S. PATENT DOCUMENTS

| | | | |
|---|---|---|---|
| 3,458,015 | 7/1969 | Collins | 188/29 |
| 3,652,103 | 3/1972 | Higgs | 188/1.12 |
| 4,543,685 | 10/1985 | Kassai | 16/35 R |
| 5,042,622 | 8/1991 | Smith et al. | 188/1.12 |
| 5,083,341 | 1/1992 | Milbredt et al. | 188/1.12 |
| 5,199,534 | 4/1993 | Goff | 188/74 |
| 5,236,066 | 8/1993 | O'Neal et al. | 188/1.12 |
| 5,288,089 | 2/1994 | Bowers et al. | 280/33.994 |
| 5,325,938 | 7/1994 | King | 188/19 |
| 5,328,000 | 7/1994 | Rutter et al. | 188/1.12 |

*Primary Examiner*—Robert L. Oberleitner
*Assistant Examiner*—Chris Schwartz

[57] ABSTRACT

A shopping cart has a brake added as an improvement. The assembly is completely enclosed within a wheel of the shopping cart and is automatically engaged when a predetermined speed is reached. When the cart is propelled beyond a normal operating speed either by being pushed or when unattended, the brake will engage. The brake is actuated by centrifugal force acting on a mechanism contained within the wheel, consisting of rotating weights and ratchet assemblies that engage to dissipate rotational energy by means of a friction connection to the axle of the wheel. Gears cause the weights to rotate at a faster rate than the wheel, so that heavier weights and counter weight springs may be used, making the brake less susceptible to actuation by jolts when the cart is pushed over uneven surfaces. The brake, being internal to the wheel assembly is protected from the effects of weather and physical abuse.

3 Claims, 8 Drawing Sheets

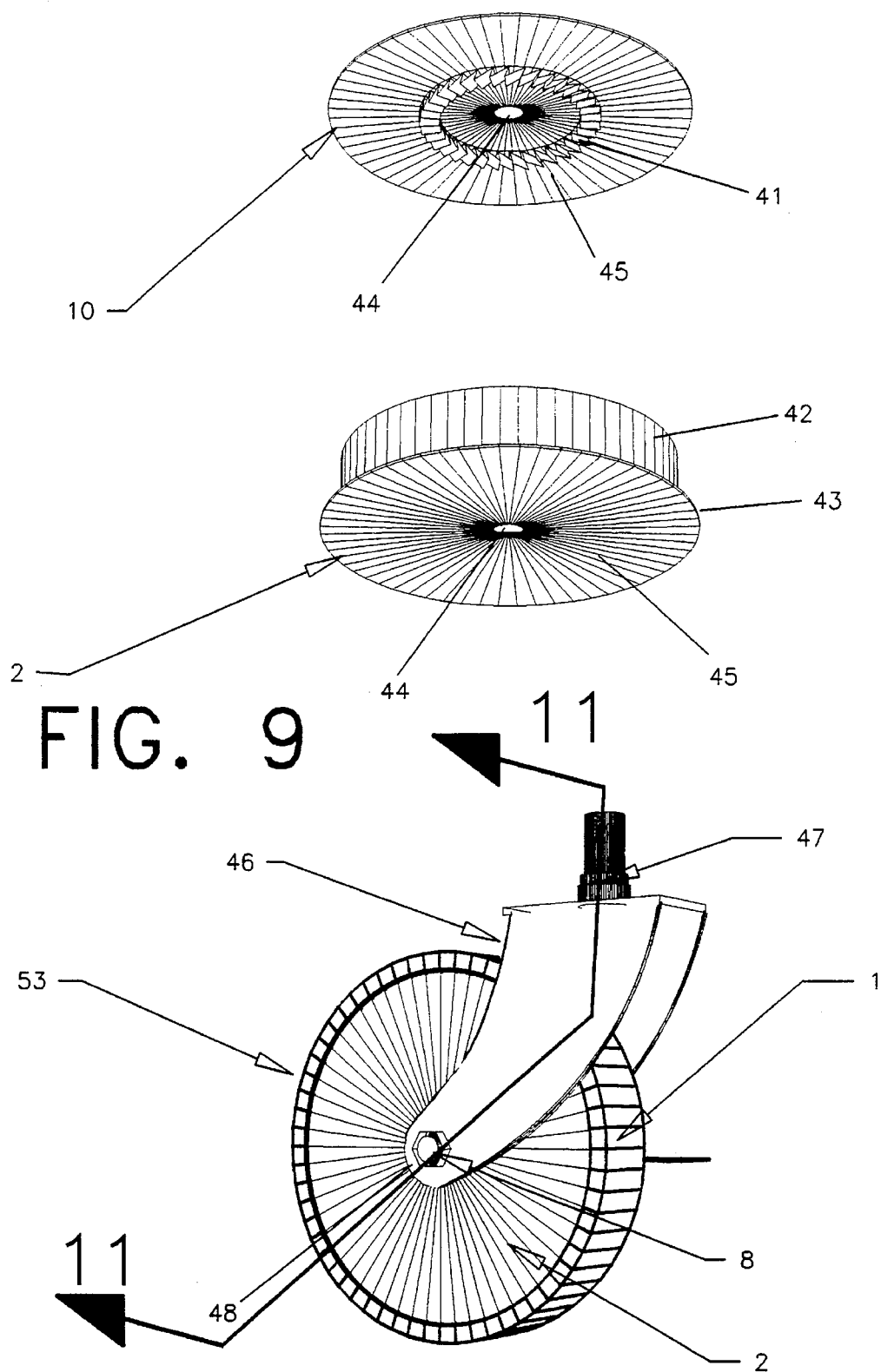

CENTRIFUGAL SHOPPING CART BRAKE

BACKGROUND OF THE INVENTION (a) Field of the invention

This invention relates to cart brakes, particularly shopping cart brakes. It more particularly relates to an automatic acting brake that is actuated at a particular speed to stop the cart.

(b) Description of the prior art

It is a common problem in modern supermarkets, malls, and discount stores with large parking lots to manage shopping carts. Customers regularly use shopping carts to transport purchased goods from the store to their vehicles. Even though stores provide outdoor racks for return of the shopping carts, some customers don't bother to place the carts in the racks. The result is, because of wind or sloping parking lots, shopping carts all to frequently roll out of control to damage automobiles or inflict injuries on pedestrians in the lot. The result of this is an annual cost to retailers and insurance companies of millions of dollars, not to mention lasting injuries to customers.

Many attempts have been made to provide shopping cart brakes to eliminate this problem, and all have some broad limitations. The first being that the brake is overly complicated to construct and the second being that the brake must be actuated by the customer when it is left in the lot. The sad fact is, is that the customer cannot be relied upon to have the presence of mind to actuate the brake when they abandon the cart in the lot. The first limitation is represented by U.S. Pat. No. 3,652,103 to Higgs. This design requires photoelectric cells, electronic timers and actuators, rechargeable batteries, and actuating device at the store exit. Not only is this approach expensive and complicated to build, but difficult to retrofit to existing carts, and would be a continuous problem to maintain. U.S. Pat. No. 5,042,622 to Smith and Powers, U.S. Pat. No. 5,328,000 to Rutter and Houseman, and U.S. Pat. No. 5,199,534 to Goff are representative of the second type of limitation. That is; they require a deliberate effort on the part of the user to engage and disengage the brake.

A universal disadvantage to all the prior art, is that the brake mechanism is exposed to one degree or the other on the frame of the cart. Since, by their nature, shopping carts are physically abused, a high degree of maintenance would be required for the prior art brake mechanisms. The prior art also is vulnerable to weather conditions, since carts are commonly left outdoors, either in cart racks or singly.

There is still an unmet need for a brake that will automatically actuate without customer action, is economical to produce and install and which can be retrofit to existing shopping cart fleets.

SUMMARY OF THE INVENTION

Accordingly, the object of the present invention is to address and to correct as many of the disadvantages of the current shopping cart brakes as is possible.

The present invention teaches improvements in shopping cart brakes. A shopping cart comprised of a frame with a basket for receiving and holding articles, and a set of wheels is improved by replacing one wheel either in front or in back with a wheel containing a centrifugal braking mechanism. The wheel may be installed during cart manufacture or retrofit to existing carts by removing and replacing a rear nonswiveling wheel or the front swiveling wheel and bracket. The swivel bracket may be adjusted for elevation so that the wheel is in contact with the ground. The brake and wheel assembly is comprised of a standard rubber tire mounted on a rim assembly of roughly the same size as current shopping cart wheels. The brake assembly is comprised of a rotating component with movable weights, which is driven by turning of the wheel. As the rate of wheel rotation increases, the sliding weights are moved against a resisting spring by centrifugal force. At a predetermined cart speed and therefore corresponding rotation and centrifugal force, the weights are in a specific position to move a ratchet shaped gear to engage a similarly shaped ratchet shaped gear on the inside face of the wheel cover. The shape of the ratchets pull and lock the two gears tightly together once they begin to engage. One of the ratchets is connected to the stationary axle by means of a semicircular friction band so that when the ratchet gears are engaged, the wheel is slowed and stopped by action of the friction between the band and axle. The brake may be released by pulling back slightly on the cart to disengage the two ratchet gears, at which point, the movable ratchet gear is pushed back into the starting position by a spring.

It is an object of the present invention to provide a centrifugal automatic shopping cart brake that will automatically engage at a certain speed thus stopping an unattended moving cart before it reaches sufficient speed to cause damage.

It is another object of the present invention to provide a centrifugal automatic shopping cart brake that will automatically engage at a certain speed to prevent customers from operating the cart at an unsafe speed.

It is yet another object of the present invention to provide a centrifugal automatic shopping cart brake that is contained in and is integral with the wheel with no exposed mechanism to be abused or broken.

It is yet another object of the present invention to provide a centrifugal automatic shopping cart brake that is contained in and is integral with the wheel so that the mechanism is protected from the weather.

It is yet another object of the present invention to provide a centrifugal automatic shopping cart brake that can be economically produced with key components of metal and the remainder of suitable plastics.

It is yet another object of the present invention to provide a centrifugal automatic shopping cart brake that does not require a conscious effort by the user to engage the brake.

It is yet another object of the present invention to provide a centrifugal automatic shopping cart brake that is actuated by centrifugal force and that may be adjusted to actuate at various speeds.

It is yet another object of the present invention to provide a centrifugal automatic shopping cart brake that can be readily fit to shopping carts during manufacture without the manufacturer having to modify assembly line procedures.

It is yet another object of the present invention to provide a centrifugal automatic shopping cart brake that can be readily retrofit to existing shopping carts.

It is yet another object of the present invention to provide a centrifugal automatic shopping cart brake that is actuated by a rotating assembly that is driven by the shopping cart wheel and rotates at a different rate than the wheel. This allows the weights and springs of the rotating assembly to be respectively heavier and stronger and so making the brake assembly less affected by movement over rough pavements and ridges or holes.

It is yet another object of the present invention in another embodiment to provide a centrifugal automatic shopping cart brake that is actuated by a movable weight assembly that rotates at the same rate as the shopping cart wheel.

It is yet another object of the present invention in another embodiment to provide a centrifugal automatic shopping cart brake that can be easily removed and replaced for maintenance.

These and other objects of the present invention will become apparent to those skilled in the art from the following detailed description showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

FIG. 9 is a detailed exploded perspective view from a generally upward angle.

FIG. 10 is perspective view of the brake-wheel assembly mounted to a swivel bracket typical in the industry.

DESCRIPTION OF THE PREFERRED EMBODIMENTS

Figure 1:
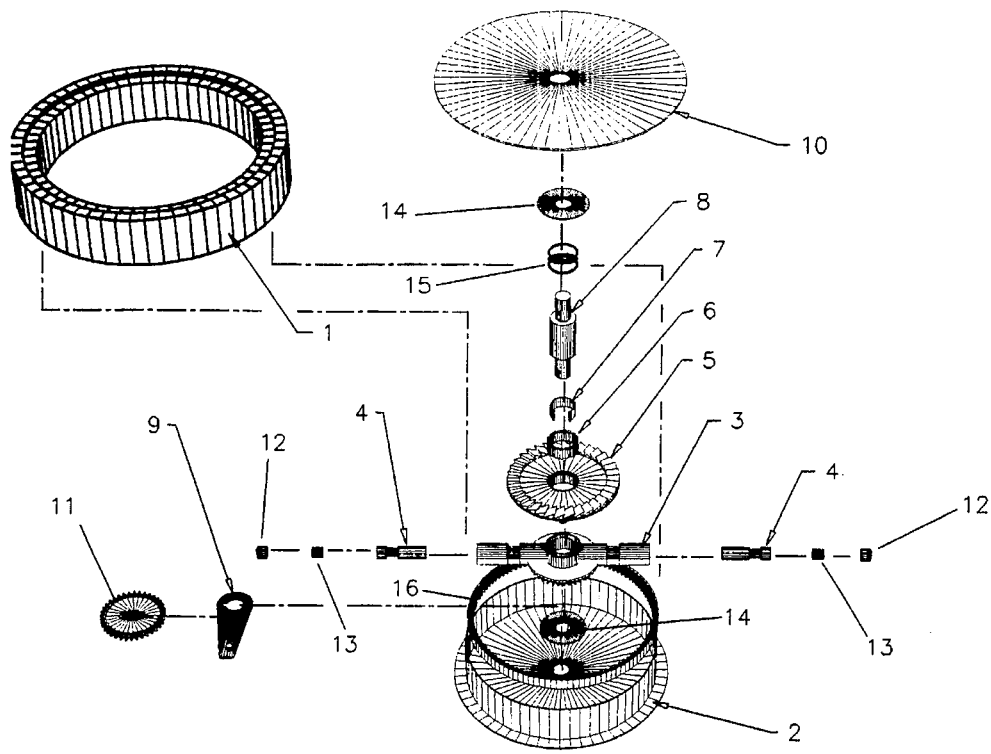
FIG. 1 is an exploded perspective view of the brake-wheel assembly from a generally downward angle.
Figure 2:
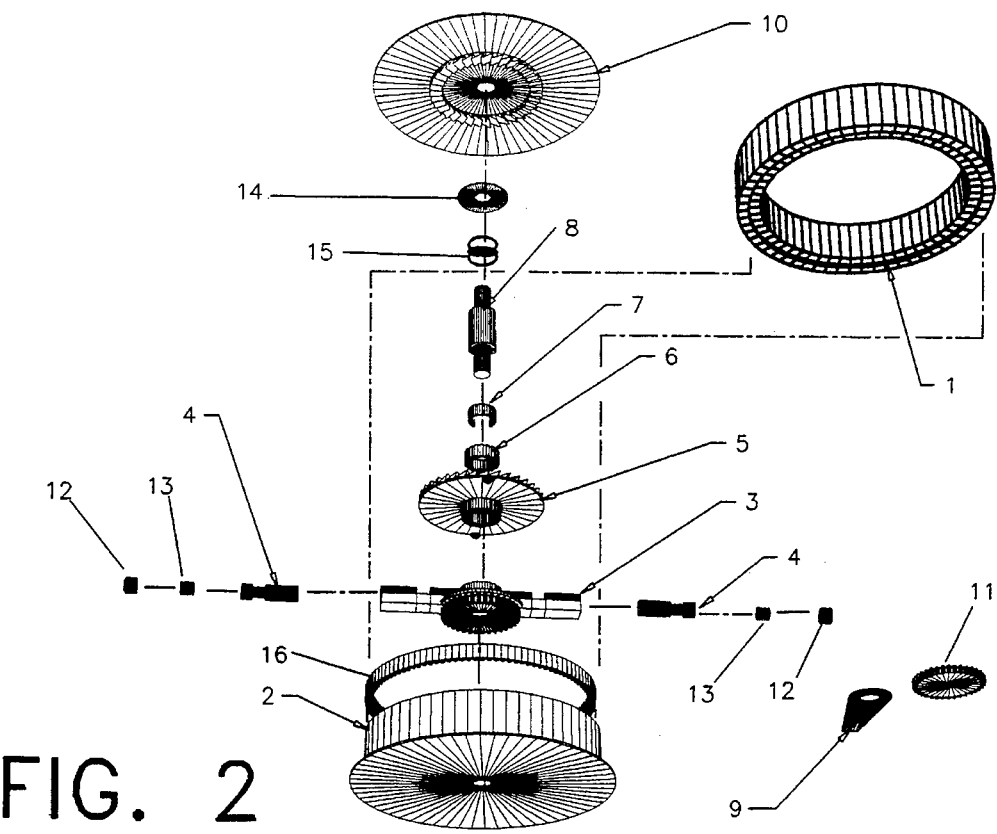
FIG. 2 is an exploded perspective view of the brake-wheel assembly from a generally upward angle.
Figure 3:
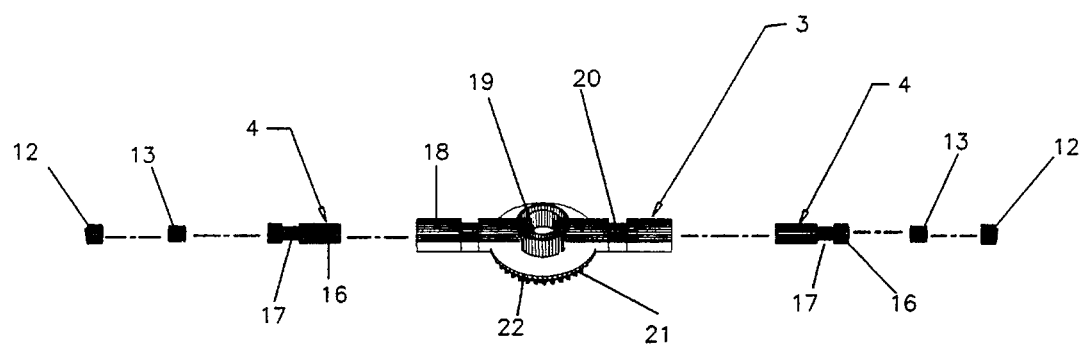
FIG. 3 is a detailed exploded perspective view of the rotating weight assembly from a generally downward angle.
Figure 4:
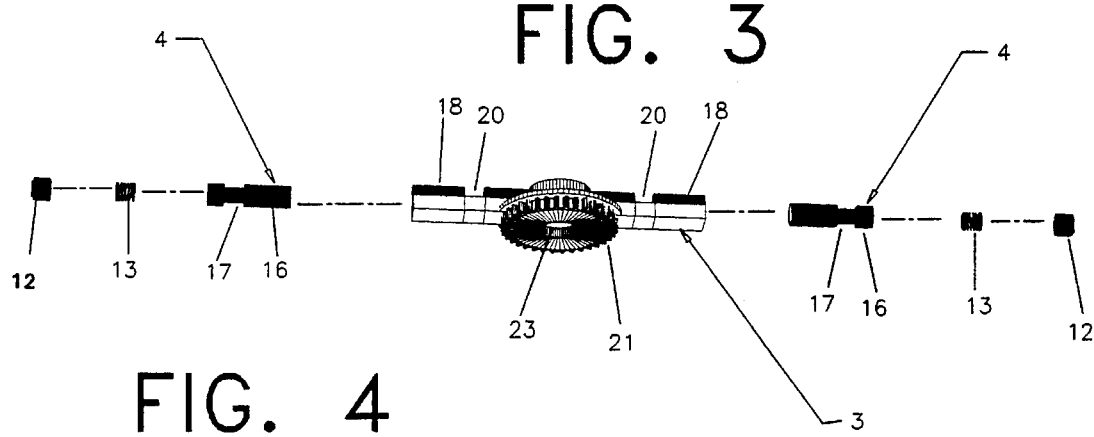
FIG. 4 is a detailed exploded perspective view of the rotating weight assembly from a generally downward angle.
Figure 5:
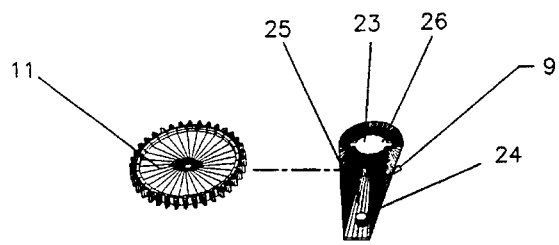
FIG. 5 is a detailed exploded perspective view of fixed carrier gear plate and weight assembly drive gear.
Figure 6:
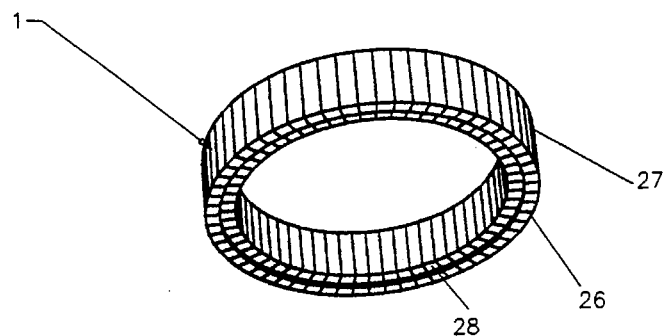
FIG. 6 is a detailed perspective view of the tire assembly.
Figure 7:
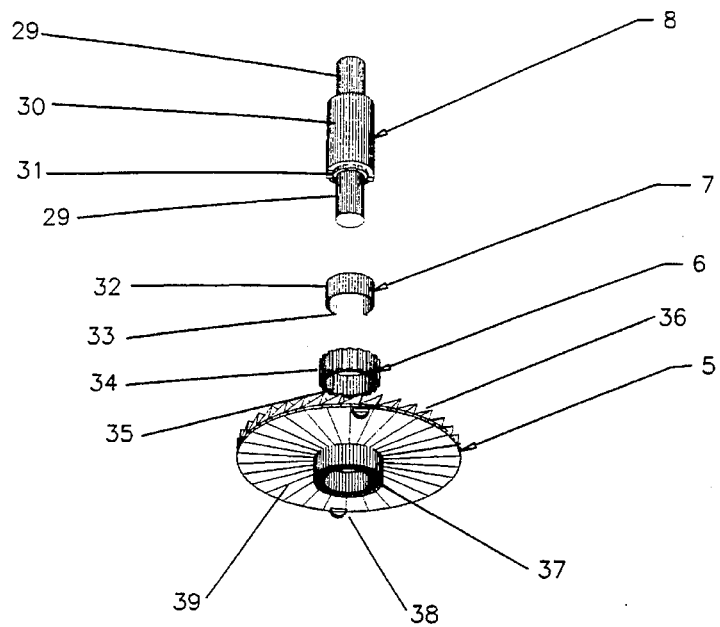
FIG. 7 is a detailed exploded perspective view of the locking ratchet gear with friction band and fluted sleeve with axle from a generally upward angle.
Figure 8:
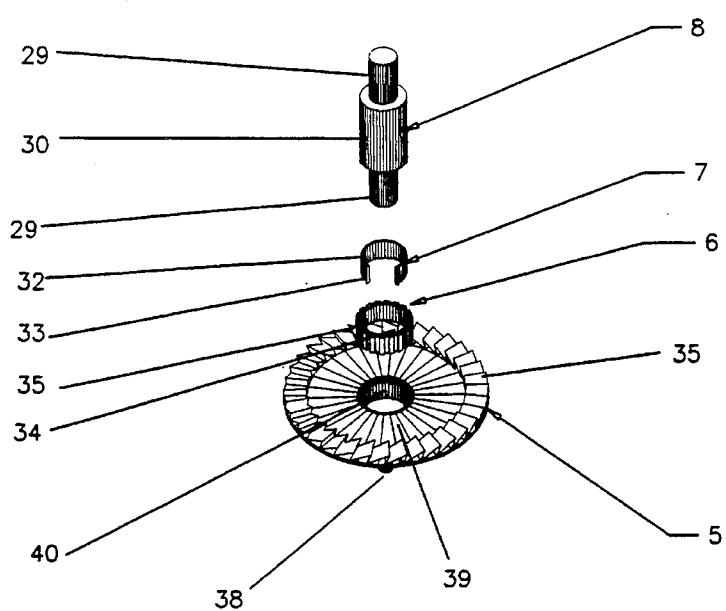
FIG. 8 is a detailed exploded perspective view of the locking ratchet gear with friction band and fluted sleeve with axle from a generally downward angle.
Figure 11:
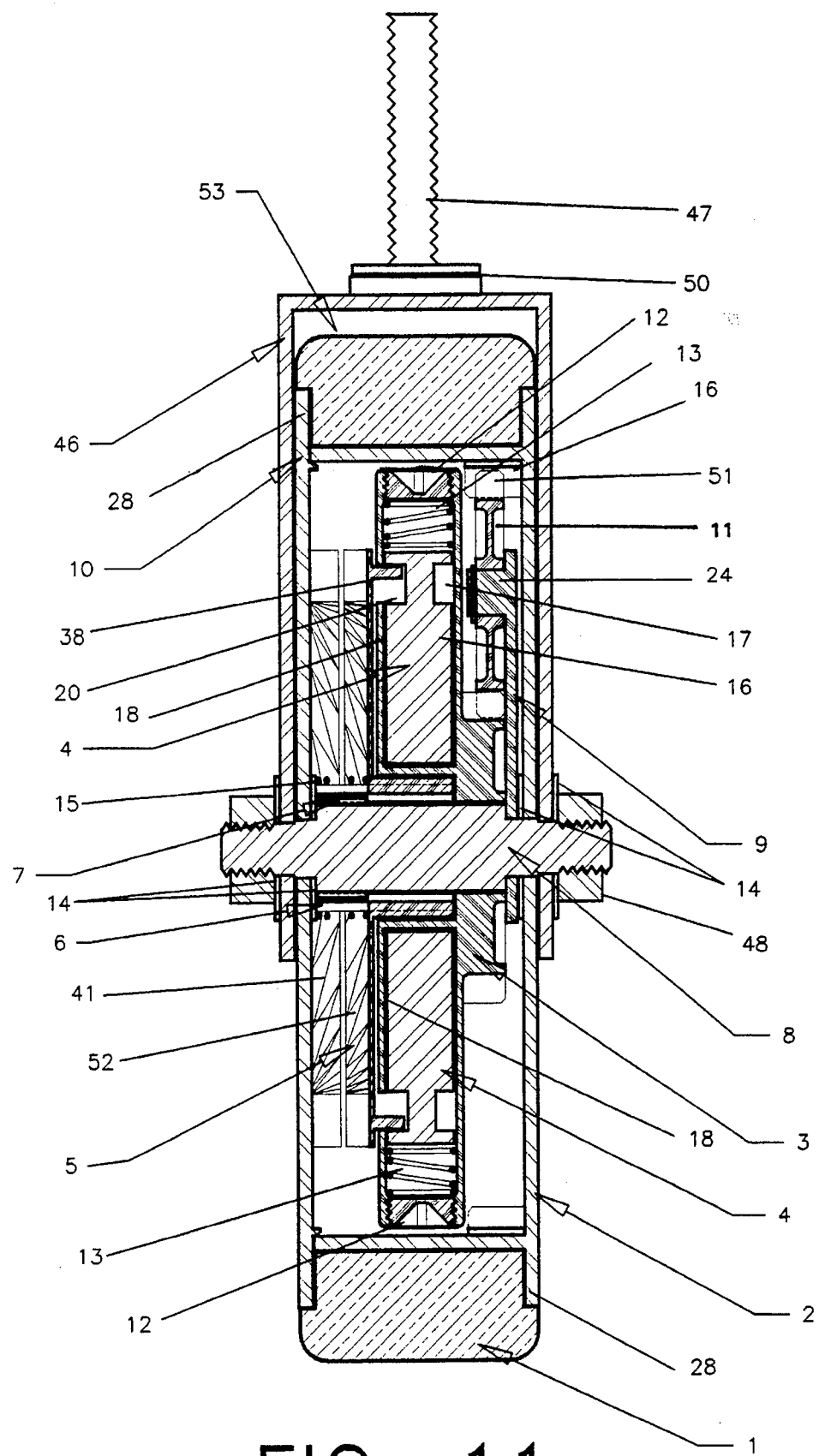
FIG. 11 is a section cut according to FIG. 10 with the brake components of the FIG. 1 embodiment in the disengaged positions.
Figure 12:
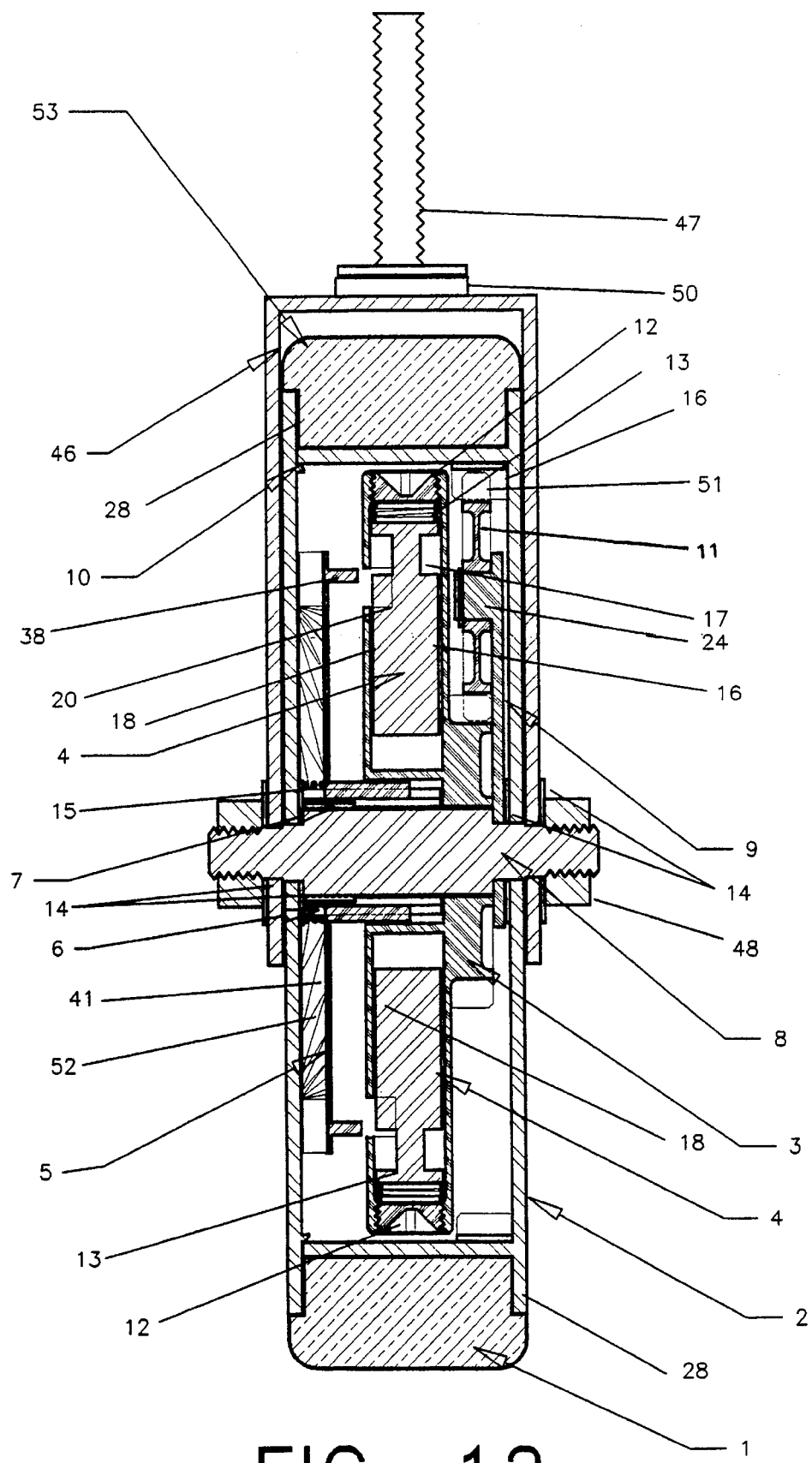
FIG. 12 is a section cut according to FIG. 10 with the brake components of the FIG. 1 embodiment in the engaged positions.

The preferred embodiment of the brake assembly can best be appreciated by referring to FIG. 1 and FIG. 2. A tire assembly 1 is fitted around a cover and rim assembly 2. A rim gear 16 is fitted to the inside face of the rim on cover and rim assembly 2 either by friction fit or with a key to prevent rotation of the rim gear relative to the rim. Also referring to FIG. 3, FIG. 4, and FIG. 5 centrifugal weights 4 are inserted into a weight carrier assembly 3 followed by counterweight springs 13 and a retaining plug 12. A weight recess 17 is aligned with a lug slot 20 in a weight tube 18. The diameter of a weight barrel 16 is sufficient for the centrifugal weight 4 to fit inside of and slide along centrifugal weight carrier tube 18. The speed at which the brake is activated can be adjusted by a screwing plug 12 inward or outward and so either moving the position of the activating feature of the centrifugal weight or by compressing and decompressing the counterweight springs 13 and so changing the resistance of the spring to movement by the centrifugal weights. In addition to the already referenced figures, also refer to FIG. 7, FIG. 8, FIG. 9, and FIG. 11. Placed in order from the inside face of rim cover assembly 2, are a washer 14, a fixed carrier gear plate assembly 9 with a drive gear 11 affixed to a gear axle 24, which is rigidly attached to a gear plate 25. Gear plate assembly 9 is prevented from rotating relative to the stationary axle assembly 8 by virtue of key slots 26 on gear carrier assembly 9 which engage key tabs 31 on stationary axle 8. Centrifugal weight assembly 3 passes over axle assembly 8 through hole 23 and positioned so that an integral gear 21 on the centrifugal weight assembly 3 engages the drive gear 11. Ratchet gear assembly 5 slides over axle assembly 8 so that a gear annular 37 slips inside of a receiver hole 19 in the weight assembly 3. Actuating tabs 38 on the ratchet gear assembly 5 are in position to pass through lug slot 20 and weight recess 17 as the centrifugal weight assembly rotates. A fluted sleeve assembly 8 engages similar flutes 40 in the ratchet gear assembly 5. so that the ratchet gear assembly 5 and the fluted sleeve 8 may not rotate relative to one another. A friction band assembly 7 is fitted over the axle assembly 8 so that a friction band 32 provides a degree of rotational resistance relative to the axle. Tongues 33 more or less vertical to the tangent of the friction band 32 engage slots 35 on the inside face of fluted sleeve assembly 6. The tongue and slot union prevent rotation of fluted sleeve assembly 6 and friction band assembly 7 relative to one another, but allows the friction band assembly to maintain pressure on the axle assembly 8 as material wears away. A spring 15 followed by washer 14 are fitted so that the spring 15 holds the ratchet gear assembly 5 in place until it is acted upon by the actuating tabs 38; A cover assembly 10 is placed so that hole 44 passes over the axle 8 with the ratchet ring 41, integral with inside face 45 in position to engage ratchet gear assembly 5. FIG. 6 illustrates the tire assembly 1 composed of a wearing face 27, side wall 26, and cover recess 28.

The sequence of operation of the brake can be best understood by consideration of all the FIGS. 1 through 12. A Wheel-brake assembly 53 is connected to swivel bracket 48.complete with a conventional swivel and bolt mounting assembly 47 and is shown in FIG. 10. Axle assembly 8 is prevented from rotating relative to a swivel bracket 46, or other chassis mounts. As the cart is pushed the wheel assembly 53 begins to rotate around axle 8. The ring gear 18 imparts rotation to drive gear 11 which is held in position by the gear carrier assembly 9. The rotation is in turn imparted to the centrifugal weight carrier assembly 3 through integral gear ring 21. The gear ratios cause the centrifugal weight carrier to rotate faster than the wheel rotation, thus allowing use of heavier centrifugal weights 4 and heavier counter weight springs 13, making the brake less sensitive to bumping and jolts. During rotation of the wheel, centrifugal force causes centrifugal weights to move outward from the center overcoming the resistant force of the counterweight springs 13. At slower rotational speeds, weight tube 18 and centrifugal weights 4 pass over actuation lugs 38 on ratchet gear assembly 5, by virtue of lug slots 20 and weight recesses 17. As rotational speed increases, the centrifugal weights move outward until the weight recess 17 moves from lug slot 20 and weight barrel 16 fills lug slot 20. On the next rotational pass, the weight barrel 16 contacts the actuation lug 38, forcing ratchet gear assembly 5 toward the ratchet ring 41 integral with the cover assembly 10. The round shape of the weight barrel allows the weight to roll as it passes over the actuation lug, smoothing the action and prolonging part lives. As the teeth of the rotating ratchet ring 41 engage the stationary ratchet gear 5 the slope of the ratchet teeth faces 52 pull and lock the two assemblies together. The ratchet gear assembly 5 is allowed to slide longitudinally along the fluted sleeve assembly 6 which houses the friction band assembly 7 clamped to axle 8. Rotational energy of the wheel assembly 53 is now transferred to ratchet gear assembly 5 and by virtue of the fluted sleeve, to the friction band assembly 7 where the wheel rotational energy is dissipated by frictional force between the axle 8 and the friction band 32. The wheel comes to a gradual stop and is prevented from rotating by the continual engagement of the ratchet ring 41 and the ratchet gear 5 and consequently to the friction band 7 clamping on the axle 8 via the fluted sleeve 6. The ratchet teeth are disengaged by turning the wheel a fraction of a turn in the opposite direction. At this point the centrifugal weights 4 have returned to their at rest position and the spring 15 pushes ratchet gear back along the fluted sleeve 6 to its at rest position. The brake, in the released and locked position are shown in detail in FIG. 11 and FIG. 12.

Figure 13:
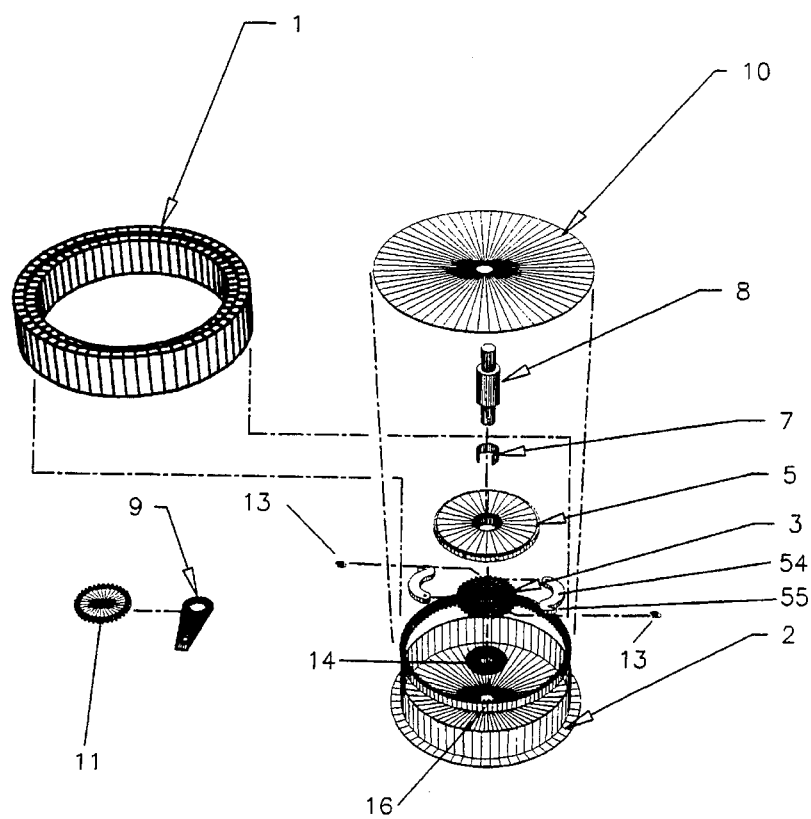
FIG. 13 is an exploded perspective view of an alternate embodiment of the centrifugal shopping cart brake with an alternate locking mechanism from a generally downward angle.
Figure 14:
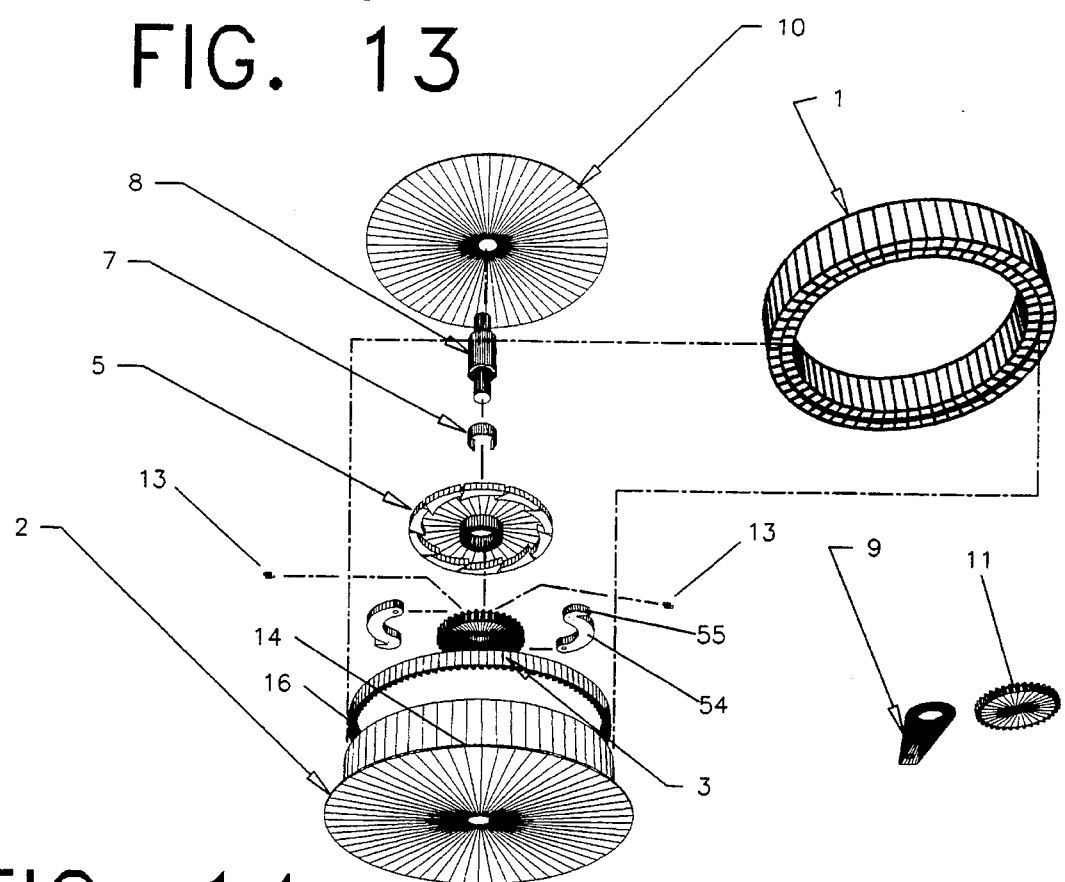
FIG. 14 is an exploded perspective view of an alternate embodiment of the centrifugal shopping cart brake with an alternate locking mechanism from a generally upward angle.

FIG. 13 and FIG. 14 represent yet another variation of the centrifugal shopping cart brake. Rather than moving interlocking ratchet rings that transfer rotational energy and dissipate it through a friction band, the rotational energy is transferred by weighted centrifugal arms 54. As in the previous embodiment, weight assembly 3 rotates at a faster rate than the wheel. As rotation of the weight assembly increases, centrifugal force causes the centrifugal arms to overcome the resistance of the counter weight springs 13 and move outward away from axle 8. At a predetermined speed, a tang 55 on the centrifugal arm 54 engages the ratchet teeth on ratchet ring 5, transferring rotational energy to the ring and consequently to the friction band 7, which is connected to the ratchet ring 5 as described previously. The friction band dissipates the rotational energy, slowing and stopping the wheel. As before, the shape of the engaging teeth hold the wheel locked, until the cart is pulled backward a fraction of a turn.

Figure 15:
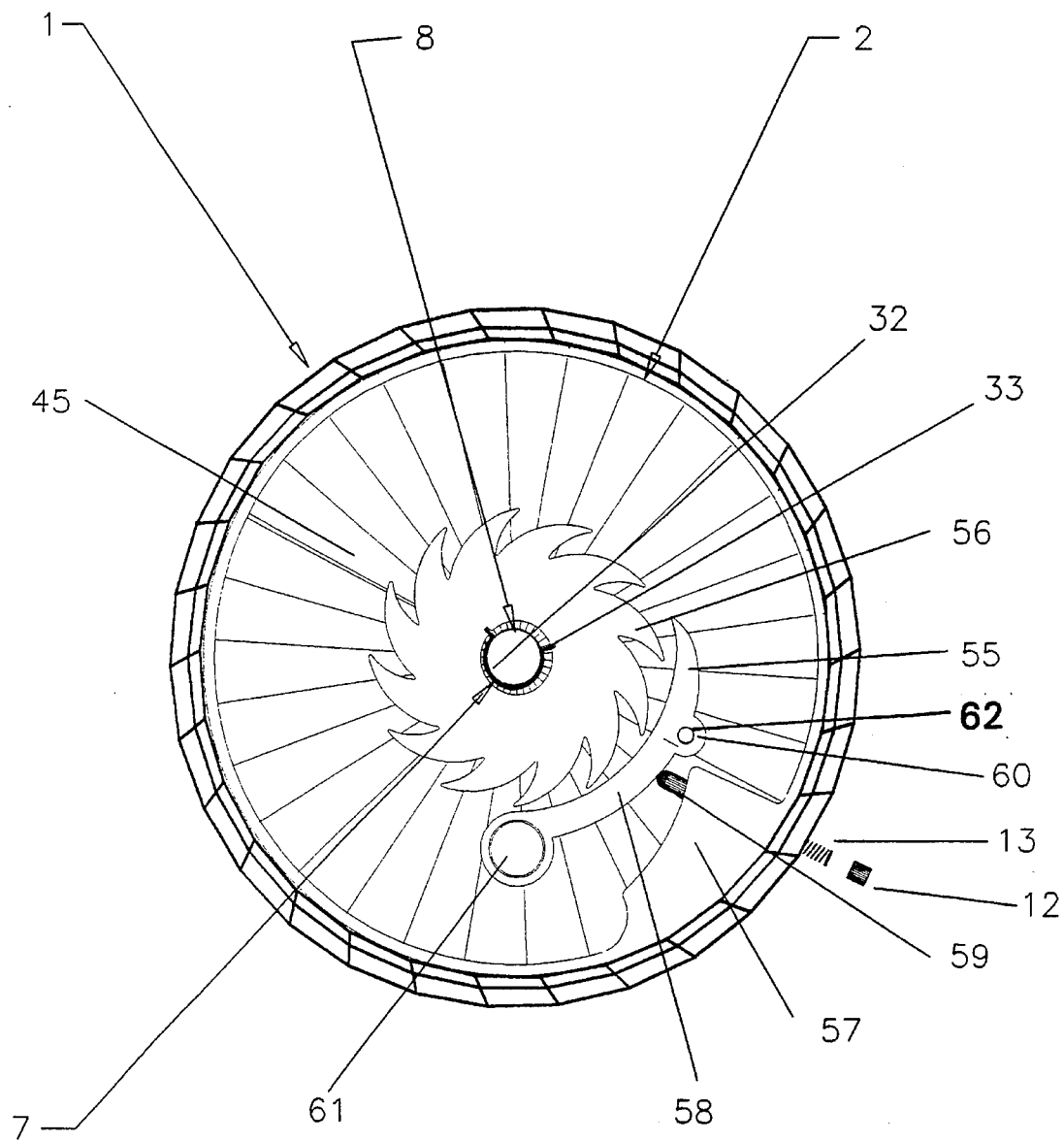
FIG. 15 is a plan view of an alternate embodiment of the centrifugal shopping cart brake with an alternate locking mechanism.

FIG. 15 represents yet another embodiment. In this case a centrifugal lever assembly 60 rotates at the same rate as the wheel assembly. Centrifugal force due to rotation causes a weight 61 to force a lever arm 58 to rotate out, about a pin 62, pushing spring pin back against counterweight spring 13, which is held in place by the plug 12 in a spring housing 57. When centrifugal force overcomes the spring resistance, a lever tooth 55 engages the ratchet teeth 56, transferring rotational energy to the ratchet gear and thus to friction band assembly 7, which is connected to the ratchet gear as above by tongues 33.

In all the embodiments, the wheel is brought to gradual stop by means of a friction band engaging the axle of the wheel/brake assembly and then held in a locked position until the cart is pulled backward a fraction of wheel rotation.

It is seen that the present invention addresses and corrects many of the disadvantages of the currently produced shopping cart brakes. It provides a brake that will automatically engage at specific speeds and stop a runaway cart. The brake allows the user to push a cart normally, but will stop the cart at excess speeds. Further it provides a brake that can be fitted to existing carts and fitted to new carts without changes to the manufacturing process. The brake is complete sealed against tampering, weather and abuse so that it represents a minimal maintenance problem, and it can be easily replaced in case of wear or malfunction. The most likely point of wear is the friction band and axle which can be easily replaced to extend unit life.

Although the description above contains many specificities, these should not be construed as limiting the scope of the invention but merely as providing illustrations of some of the presently preferred embodiments of this invention. For example, where two centrifugal weights are shown, one or more may be used. The shape of the weights may vary and the ratio of weight assembly rotation to wheel rotation may be varied by changing gear sizes or adding additional gears to drive the assembly.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

Thus the scope of the invention should be determined by the appended claims and their legal equivalents, rather than by the examples given.

What is claimed is:

1. An automatic wheel brake assembly for a shopping cart comprising;
    a. a wheel assembly composed of at least two parts and containing a brake assembly in a space formed therebetween; said wheel assembly being rotatably mounted upon a fixed axle;
    b. a means of imparting rotation from an inside surface of said wheel assembly to an intermediate rotational means;
    c. an assembly containing weighted elements free to move in a direction generally radial outward from said axle against a spring means upon excessive rotation of said wheel assembly and where said assembly containing said weighted elements is rotated by said intermediate rotational means, said intermediate rotational means causing said assembly to rotate at a greater rate than said wheel assembly;
    d. a rotational transfer means comprising at least two interlocking components, one of which comprises an integral brake actuation means and moves from a free or unlocked position to a locked position via contact of said brake actuation means with said weighted elements, a second of said components being fixed to the inside surface of one of said wheel assembly parts, where when said one component is moved to said locked position said components interlock to rotate together;
    e. a collar around said fixed axle with means to allow said one component to slide longitudinally along said collar between said unlocked and locked positions and means to prevent rotation of said collar relative to said one component;
    f. a friction means to frictionally connect said collar to said axle, said friction means fixed against rotation relative to said collar; whereupon activation of said weighted components to engage said one interlocking component causes said friction means to frictionally engage said axle and brake said wheel assembly;

g. interlocking means on each of said interlocking components to keep said components locked together after said wheel assembly has stopped rotating, said interlocking means releasing upon rotation of said wheel assembly in the opposite direction;

h. an adjustment means capable of varying resistance to movement of said movable weighted elements against said spring means.

2. An automatic wheel brake assembly for a shopping cart comprising;

a. a wheel assembly composed of at least two parts and containing a brake assembly in a space formed therebetween; said wheel assembly being rotatably mounted upon a fixed axle;

b. a means of imparting rotation from an inside surface of said wheel assembly to an intermediate rotational means;

c. an assembly containing weighted elements free to move in a direction generally radial outward from said axle against a spring means upon excessive rotation of said wheel assembly, where said assembly containing said weighted elements is rotated by said intermediate rotational means, said intermediate rotational means causing said assembly to rotate at a greater rate than said wheel assembly;

d. an interlocking component, said weighted components moving from a resting position to an activation position upon excessive rotation of said wheel assembly, where when said weighted components are in the activation position said components engage said interlocking component so that said rotating assembly containing the weighted components and said interlocking component are locked and rotate together about said fixed axle;

e. a friction means surrounding said axle and surrounded by and rotationally fixed to said interlocking component to frictionally connect said interlocking component to said axle;

whereupon activation of said weighted components to engage said interlocking component causes said friction means to frictionally engage said axle and brake said wheel assembly.

3. An automatic wheel brake assembly for a shopping cart comprising;

a. a wheel assembly composed of at least two parts and containing a brake assembly in a space formed therebetween; said wheel assembly being rotatably mounted upon a fixed axle;

b. an interlocking component rotatably fixed to said axle;

c. a friction means surrounding said axle and surrounded by and rotationally fixed to said interlocking component to frictionally connect said interlocking component to said axle;

d. a weighted assembly fixed to the inside surface of one of said parts of said wheel assembly and comprising a movable weight which moves between a free or unlocked position to a locked position upon excessive rotation of said wheel assembly; said weighted assembly further comprising a brake actuation means, said actuation means engaging said interlocking component when said movable weight moves to said locked position thereby causing said friction means to frictionally engage said axle and brake said wheel assembly.

* * * * *